United States Patent [19]

Miller

[11] 4,181,897
[45] Jan. 1, 1980

[54] HIGH POWER MOLECULAR GAS LASER

[75] Inventor: Coleman J. Miller, Severna Park, Md.

[73] Assignee: Westinghouse Electric Corp., Pittsburgh, Pa.

[21] Appl. No.: 740,221

[22] Filed: Jun. 26, 1968

[51] Int. Cl.$^2$ ............................................. H01S 3/223
[52] U.S. Cl. ................................................. 331/94.5 G
[58] Field of Search ......................................... 331/94.5

[56] References Cited

FOREIGN PATENT DOCUMENTS 1016576  1/1966  United Kingdom .................... 331/94.5

OTHER PUBLICATIONS

Muller et al., "Non-equilibrium Distributions of Molecular Vibrational States", App. Phys. Lett. 2, (4) Feb. 15, 1963, pp. 86–88.
Ericsson et al., "Generation of Short Light Pulses by Superradiance in Gases", Arkiv Fur Fysik 37 (6) article #35, May 7, 1968, pp. 557–568.
Pollack "Laser Oscillation in Chemically Formed CO", Appl. Phys. Lett., vol. 8, No. 9, pp. 237–238, May 1, 1966.
Deutsch "OCS Molecular Laser", Appl. Phys. Lett., vol. 8, No. 12, pp. 334–335, Jun. 15, 1966.

Primary Examiner—William L. Sikes
Attorney, Agent, or Firm—M. P. Lynch

[57] ABSTRACT

Stimulated emission from a molecular laser gas medium at a pressure in the order of atmospheric pressure is achieved by generating electrons having an average kinetic energy approximately equal to an upper molecular vibrational-rotational energy state within the electronic ground level of the laser gas medium for creating a population inversion between said upper molecular vibrational-rotational state and a lower molecular vibrational-rotational state within the electronic ground level of the molecule laser gas medium.

45 Claims, 11 Drawing Figures

HIGH POWER MOLECULAR GAS LASER

BACKGROUND OF THE INVENTION

1. Field of the Invention

The present invention relates generally to high energy output lasers and more particularly relates to a high power gas laser wherein the active material utilizes carbon monoxide.

A gas laser has a very important advantage for high energy applications; it is possible to build a huge laser rod out of gas, and still maintain good optical quality.

In the current state of the laser art, solid state lasers using materials such as ruby or neodymium glass are capable of providing output pulses in the one millisecond range with relatively high energy density. However, the efficiency is not very high, and the total energy is restricted by considerations of optical homogeneity and pumping difficulties, both of which get rapidly more serious as the size of the laser rod is increased.

One of the gas lasers previously available, the carbon dioxide ($CO_2$) laser is most suited to high power. While such a laser has heretofore had the highest efficiency, it is not suited to high energy pulse operation because of the low pressure and hence low density at which it must operate.

2. Description of the Prior Art

Laser operation has been previously observed in carbon monoxide. Pulse operation has been observed in carbon monoxide by others as reported, for example, by L. E. S. Mathias and J. T. Parker in *Physics Letters*, Volume 7, No. 3 dated Nov. 15, 1963 on page 194, entitled "Visible Laser Oscillations from Carbon Monoxide" and by C. K. N. Patel and R. J. Kerl, in *Applied Physics Letters*, Volume 5, No. 4, dated Aug. 15, 1964, on page 81 in an article entitled "Laser Oscillations on $X^1\epsilon+$ Vibrational-Rotational Transistions of CO". Continuous wave operation has been also observed by others in nitrogen-carbon monoxide mixtures as reported by N. Legay-Sommaire, L. Henry, and F. Legay, in *Compt. rend.*, Volume 260, page 33–39 (1965) and by C. K. N. Patel, *Applied Physics Letters*, Volume 7, No. 9, dated Nov. 1, 1965, at page 246, in an article entitled "CW Laser on Vibrational-Rotational Transistions of CO".

However, the foregoing laser operations have all been at low carbon monoxide pressure and none have utilized the laser transition of the present invention which allows for very high energy pulsed operations at efficiencies much higher than any laser of the prior art.

Accordingly, an object of the present invention is to provide a laser suitable for pulsed operation with higher efficiency and higher energy than any laser now known.

Another object of the present invention is providing high power gas laser utilizing carbon monoxide as the active material.

Another object of the present invention is to provide a carbon monoxide laser which is operative under high pressure conditions, i.e., near atmospheric pressure.

Another object of the present invention is to provide a laser having output capabilities of several joules per cubic centimeter and capable of total pulse output in the order of $10^6$ to $10^9$ joules.

SUMMARY OF THE INVENTION

In accordance with the broad principles of the present invention, stimulated emission from a molecular laser gas medium at a pressure in the order of atmospheric pressure is achieved by generating electrons having an average kinetic energy approximately equal to an upper molecular vibrational-rotational energy state within the electronic ground level of the laser gas medium for creating a population inversion between the upper and lower molecular vibrational-rotational states within the electronic ground level of the molecular laser gas medium.

One aspect of the invention is directed to a laser using a pulsed electrical discharge in pure carbon monoxide at a pressure of at least 0.1 atmosphere, with emission from the P-branch of the lowest vibrational transition to the vibrational ground state.

Operation of the laser depends upon the observed fact that electronic excitation in carbon monoxide is coupled very much more to vibrational levels in the carbon monoxide than to translational or rotational energy. This, along with the very low coupling from vibration levels to translational and rotational levels in carbon monoxide, allows the vibrational temperature to become much higher than the rotational temperature. Hence population inversion is allowed to occur in a system which is in thermal equilibrium except for the difference between vibrational and rotational temperatures.

BRIEF DESCRIPTION OF THE DRAWING

Further objects and advantages of the present invention will be readily apparent from the following detailed description taken in conjunction with the drawing in which:

Referring to FIG. 1, active material 2 in the form of carbon monoxide gas is enclosed in a tube 4. The tube 4 has Brewster angles 6 and 7 at each end, although the Brewster angle 7 may be sufficient. A mirror 8 is mounted external the dewar 10 to allow adjustment and permit use of a long cavity to attain good directivity and insure cavity modes near the center of the laser lines. The Brewster angle ends 6 and 7 may advantageously be calcium fluoride or any other suitable substance transparent at both visible and laser frequencies for easy alignment.

Figure 1:
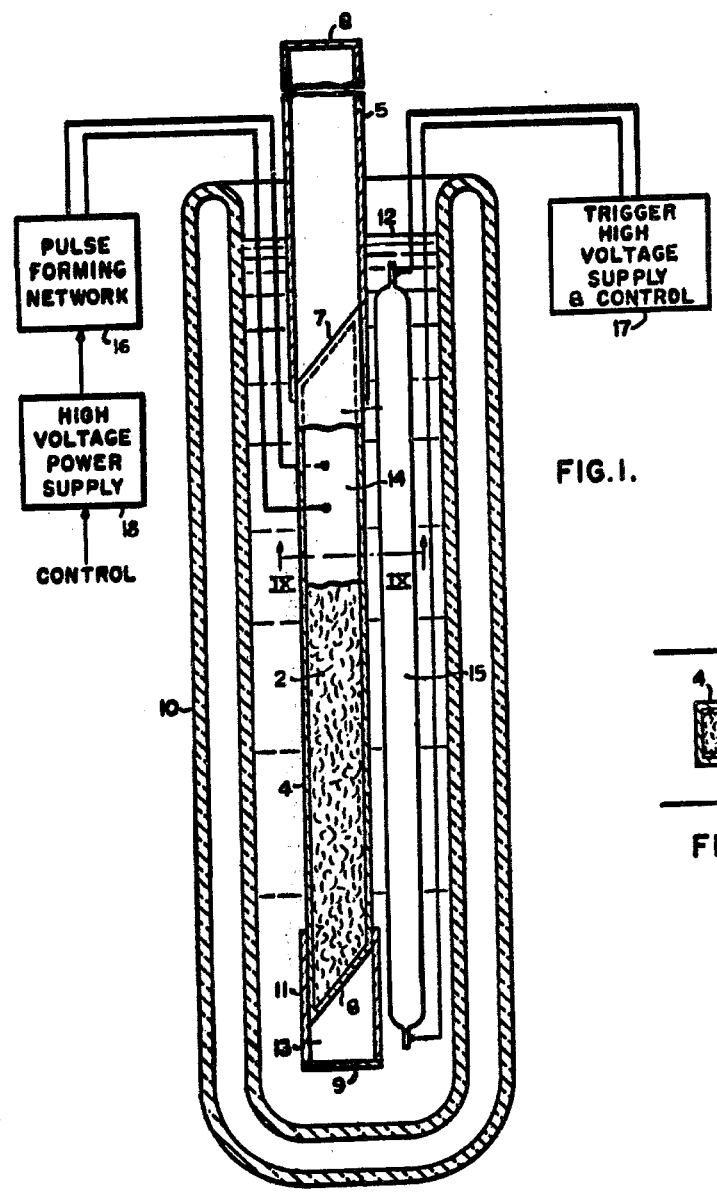
FIG. 1 shows an illustrative embodiment of the invention partly in block schematic form.

Like any pulse laser, it is advantageous to be able to align the optical cavity with a separate continuous wave laser source, and if this is done the illustrative embodiment utilized must recognize the difference in optical properties of the materials used at the laser frequency and at the alignment frequency.

The cavity or tube 4 contains the carbon monoxide at relatively high pressure; that is, at a pressure of at least 0.1 atmosphere. The manner of selecting the pressure of the active material to practice the present invention will be described in greater detail hereinafter.

Cooling is obtained by enclosing the unit in a liquid nitrogen dewar 10. The dewar 10 contains the liquid nitrogen 12. Less heat loss will occur when the space between the top of the dewar 10 and the level of liquid nitrogen 12 is made larger.

The laser resonator is illustrated to be vertically disposed, having a fixed mirror 9 at the bottom of the resonator inside the dewar 10, and the adjustable mirror 8 providing output coupling located outside the dewar 10. The fixed mirror 9 is secured to the end of the laser tube 4 by means of an appropriately attached sleeve 11. Both liquid nitrogen and carbon monoxide are excluded from the space 13 contained by the Brewster angle 6, mirror 9 and sleeve 11 to limit absorption and distortion of the laser beam. The space 13 may be evacuated or filled with nitrogen at less than atmospheric pressure or with neon at atmospheric pressure. In a small size laser, solid glass can fill the space 13. The mirror 9 would then be disposed at an angle because of refraction of the laser beam. The mirror 8 will be of a type which allows extraction of some light from the apparatus for a useful purpose. Sleeve 5 excludes liquid nitrogen and carbon monoxide in the same manner as sleeve 11. The space defined by sleeve 5 may be sealed and filled as at the bottom to avoid frosting.

The liquid nitrogen 12 provides a cold trap for eliminating carbon dioxide impurities from the carbon monoxide gas when filling the tube 4. Provision for flowing gas during operation appears entirely unnecessary for such a unit, so that a single filling tube can be used.

Direct current discharge has been provided. Two simple flat electrodes 14 are disposed within the tube 4 and are electrically connected through the tube 4 to a pulse forming network 16. A high voltage power supply 18 provides the required charge to a storage capacitor in the pulse forming network 16.

A flash lamp 15, with its own high voltage power supply and triggering circuit 17, provides a short pulse of high intensity ultraviolet illumination to initiate the discharge by photoemission.

The rating or size of the various components illustrated will vary with the desired mode of operation of the illustrative embodiment. These relationships will be more fully explained and understood when the theory upon which the present invention is based is further set forth. Of course actual sizes should also depend upon available components.

The quantized energy states of CO, like those of all diatomic molecules, are characterized by two integers, a rotational quantum number J and a vibrational quantum number v. The energy levels of these states, the relative number of atoms in each state, and the allowed transistions between states, can all be determined quite accurately provided certain constants associated with the molecule are known. See Hertzberg, "Spectra of Diatomic Molecules", D. Van Nostrand Co., 1950. Hertzberg gives the values of the needed constants for CO, although more recent and accurate values are available in *Applied Physics Letters*, Vol. 7, page 246 (1965), by C. K. N. Patel. The allowed vibrational transitions require a change of $\pm 1$ in both vibrational quantum number v and rotational quantum number J. An increase of one in v is accompanied by the absorption of radiation, while a decrease in v produces emission of radiation, so only the decrease in v is of interest as a laser transition. Also, because of the rapid decrease in the number of molecules in states of higher v, only the transition from $v=1$ to $v=0$ is employed. All transitions in which J increases by one are designated the P-branch, while those in which J decreases by one are designated the R-branch. If the vibrational temperature of the gas exceeds the rotational temperature, a population inversion can occur on some of the P-branch vibrational lines. On the other hand, a population inversion cannot occur on the R-branch unless the vibrational temperature becomes negative, so only P-branch transitions are used in this laser. See *Journal of Chemical Physics*, Volume 34, page 347, by J. C. Polonyi, entitled "Proposal for an Infrared Maser Development Dependent on Vibrational Excitation" (1961).

Figure 2:
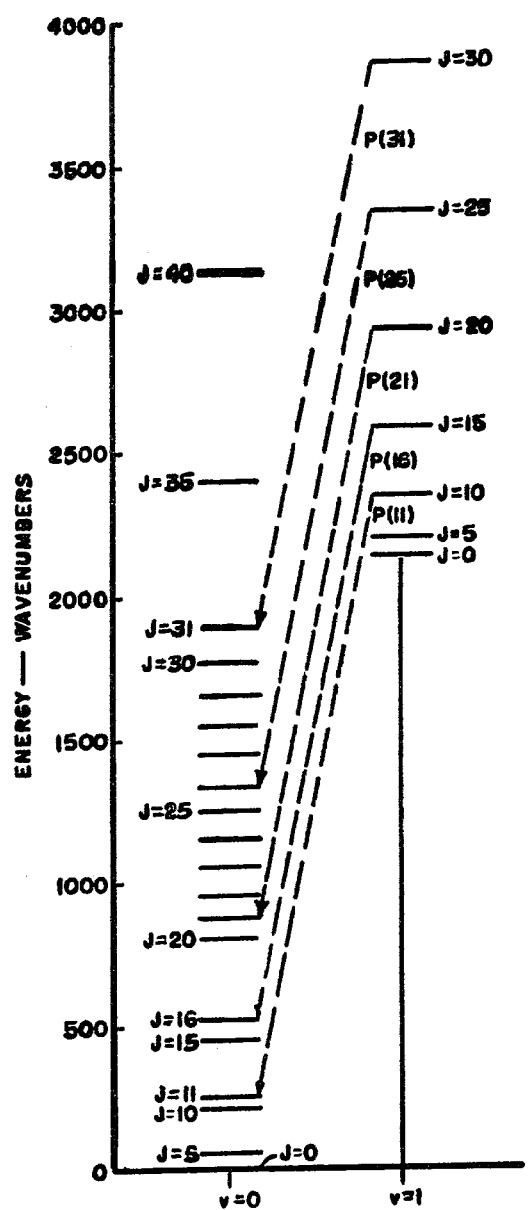
FIG. 2 is a schematic illustration of energy levels of interest for the present invention.

FIG. 2 shows the energy levels and transitions of interest for a high power CO laser in accordance with the present invention. For clarity, some of the J values have been omitted. The frequencies of the transitions are known to a much higher degree of accuracy than can be determined from FIG. 2. The frequency of the transition is given to high accuracy by the expression $$P(J) = 2143.271 - 3.75770 \, J - 0.05256 \, J^2 + 24.703 \times 10^{-6} \, J^3 + 1.76 \times 10^{-9} \, J^4 \, cm^{-1}.$$

The P(J) transition, as indicated in FIG. 2, is one in which the lower level is J and the upper level J-1. Possible laser transitions from $v=1$ to $v=0$ are indicated by the arrowed dashed lines.

Figure 3:
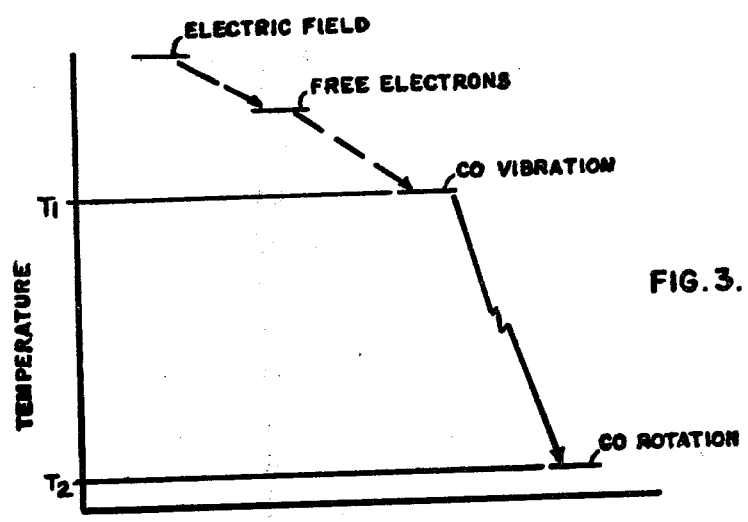
FIG. 3 is a schematic illustration of a laser cycle of the present invention.

FIG. 3 shows the operation of the laser cycle. The externally applied electric field couples only to charged particles, and because they are thousands of times lighter than the ions in the discharge, virtually all of the energy goes to the free electrons in the discharge, which are thus maintained at a very high temperature. Carbon monoxide has the property that electrons, especially high temperature electrons, transfer energy very much more effectively to vibrational levels than to rotational levels, and it has the further property that the interchange of energy between vibrational levels and rotational levels is very low. Thus, the electrons transfer enough energy to the CO vibrational levels to give it a very high temperature, while at the same time the energy going into the rotational levels is so small that the rotational temperature stays low. The difference between vibrational temperature and rotational level is great enough to produce a useful population inversion on some of the P-branch transition, and laser output occurs. All other sources of energy transfer are incidental to the laser operation, many of them producing sources of loss to limit the laser effectiveness. Most of them, however, have been calculated to have small effect on the operation. Eventually, the losses cause the rotational temperature to rise to the point where the laser operation ceases. This makes the laser basically a pulsed device, with output time of the order of 1 millisecond, although this can be varied somewhat by adjusting the parameters.

Figure 4:
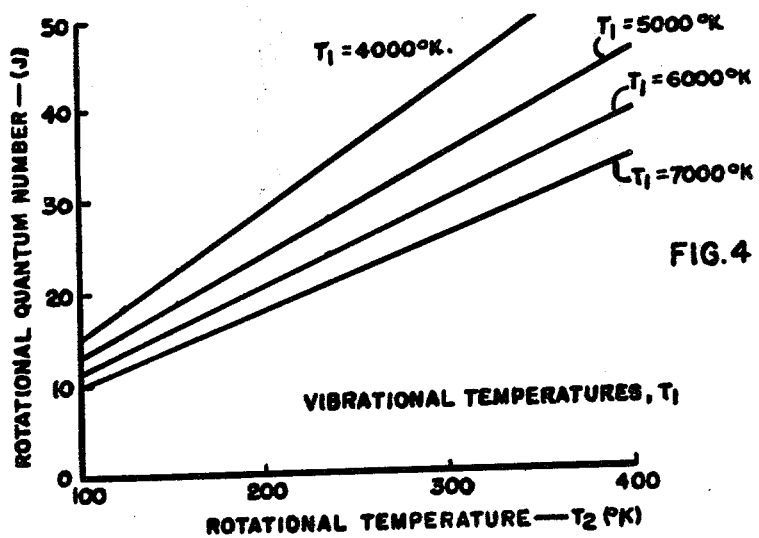
FIGS. 4 and 5 are graphical representations useful in understanding the present invention.
Figure 5:
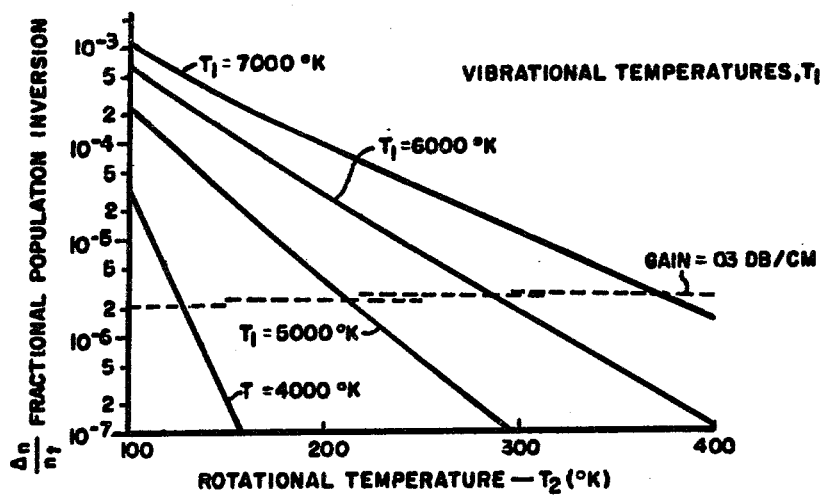

Using Hertzberg's formulas with two different temperatures, $T_1$ for vibrational temperature and $T_2$ for rotational temperature, the transition having the largest population inversion and the magnitude of this inversion have been calculated, with the results indicated in FIGS. 4 and 5. FIG. 4 shows which transition has the largest population inversion for any combination of $T_1$ and $T_2$ within the region of most interest. FIG. 5 shows the fractional population inversion $\Delta n/n_t$. Here $\Delta_n$ is the difference between the number in the upper laser level and the number in the lower laser level, in a volume of one cubic centimeter containing $n_t$ total molecules. For each combination of $T_1$ and $T_2$, the population inversion shown is that corresponding to the J value having the greatest population inversion at that combination of temperatures.

The gain constant G of the laser in decibels per centimeter can be expressed by:

$$G = 4.34 \frac{S_J}{v_j n_J} \sqrt{\frac{300}{T_2}} \frac{\Delta n}{n_T} \text{ db/cm} \quad (1)$$

where $S_J$ is the line strength, $v_J$ the line halfwidth, determined at 300° K. with a fractional population $n_J$ in the rotational level J. These factors are known for CO; see for example, *Astrophysics Journal*, Vol. 135, page 277 by W. S. Benedict, R. Herman, G. E. Moore, and S. Silverman (1962). Hence the gain constant can be determined with considerable accuracy. For a small laser of 20 cm long a gain constant, G, of 0.03 db/cm would result in 0.6 db gain. Such gain is much higher than the figure of 0.1 db often used for gas lasers, and is ample for useful operation. The dash lines in FIG. 5, show the fractional population inversion required as a function of temperature to obtain a constant gain of 0.03 db/cm. In a large, high energy laser, of say 10 meters in length, a gain constant G of 0.01 db/cm would provide a 10 db gain, more than enough. A 35 foot deep tank of liquid nitrogen could be impracticable however. Hence, certain modifications to the structure of FIG. 1 must be made. For example a large unit would preferably be horizontal and cooling is accomplished with liquid nitrogen flowing through cooling pipes surrounding the tube 2 rather than one huge tank 10. An optically folded discharge tube may be advantageously used when the length is too great.

Three different time constants in the CO gas itself must be considered. These are the time constant for establishing vibrational equilibrium, the time constant for establishing rotational equilibrium, and the time constant for establishing equilibrium between vibration and rotation. The thermal relaxation of rotational excitation is the only mechanism available in this cycle for depleting the lower laser level, and it must be quite short. Relaxation from vibrational to rotational energy is both a loss mechanism and a mechanism for populating the lower laser level, so it should be as long as possible. Vibrational relaxation helps to keep the vibrational levels in thermal equilibrium, so that a short time constant is desirable, but this is much less important than the other two.

The best experimental values for rotational relaxation in gases are obtained from acoustic measurements, where the relaxation from translation to rotational energy produces frequency sensitive absorption and dispersion. Knowledge of the results of these measurements are not really necessary to practice the present invention but are helpful in understanding necessary theoretical background, M. Greenspan, in the "Journal of Acoustic Section, Vol. 31, page 155 (1959) has measured and provided values in nitrogen which is very similar to carbon monoxide. Such measurements give $Z_R \approx 4.5$ at 300° K. $Z_R$ is identified as the time constant for transfer of energy from translation to rotation, measured in units of the mean kinetic collision time. At 300° K., most of the molecules are near the $J=10$ rotational level. In a rotational collision involving quadrapole moments, as in nitrogen and carbon monoxide, $\Delta J=2$ is by far the most probable, involving an average energy exchange of 75 cm$^{-1}$. Since the mean energy at 300° K. is 209 cm$^{-1}$, only about 0.036 of the translation energy is exchanged in each rotational collision, resulting in a collision number $Z_{RR} \approx 1.6$ for rotational exchange.

The collision number $Z_P$ associated with pressure broadening of vibrational transitions should be correlated with that for rotational exchange, since it represents the mean time between collisions which perturb the rotational states sufficiently to make the amplitude or phase uncorrelated before and after the collision. Then during the collision this energy must be coupled into the interaction energy of the two molecules. Upon separation it would be expected to go with equal probability into either of the two molecules, so that collision numbers $Z_{RR}$ would be expected to be twice the collision number $Z_P$. For carbon monoxide, W. S. Benedict et al, supra, has measured $Z_P$ as approximately 0.8, giving again $Z_{RR}$ approximately equal to 1.6, for transitions $J=10$. For transitions near $J=26$, where the relaxation process is most critical in the laser cycle, $Z_P=1.15$, so that $Z_{RR} \approx 2.3$.

By a completely different method, using theory to go from measured vibrational relaxation times to rotational relaxation times, $Z_R$ has been determined as 4.48 for $N_2$ and 3.58 for CO. This confirms use of the $N_2$ numbers for CO, and gives confidence that the temperature dependence can be determined from the same theory. It is found that, as the temperature is decreased from 300° K. to 100° K., $Z_R$ decreases more rapidly than the collision rate, so that the 300° K. value should be conservative for lower temperatures.

Hence it is with considerable confidence that the value of 2.3 for the collision number $Z_{RR}$ can be used to explain the theory of operation on the present invention and will thus be used to illustrate computations showing the effect of roational relaxation on population inversion. Near the laser transition each rotational level will have a population of approximately $e^{-3085/T_1}$ of the level above it, or $e^{-6170/T_1}$ of the level two steps above it. Then, for stepwise depopulation of the lower laser level in steps of rotational quantum number $\Delta J=2$, the excess population $\Delta n_L$ required in the lower laser level for a rate of q laser transistions/sec for each molecule will be given approximately by:

$$\frac{\Delta n_L}{n_T} = \frac{Z_{RR} q}{f_c \left(1 - e^{-\frac{6170}{T_1}}\right)} \quad (2)$$

The defect in upper laser level population will be the same. The population inversion will also differ from equilibrium because of the vibrational relaxation time. The process involved here is resonant, with one molecule increasing its vibrational level by one while the other decreases its level by one. Even with the resonance, the process is much less likely than rotational exchanges, but because of the much greater population in the vibration levels the vibrational exchanges are within acceptable operating norms. D. Ropp, in the

*Journal of Chemical Physics,* Vol. 43, page 216 (1965) shows that the vibrational exchanges $Z_{vv}$ can be given by $1/(3.7 \times 10^{-6} \text{ T})$. In order to relax from the ground state, a molecule must collide with one having a vibrational quantum number $v \geq 2$ so that the population of these states must be included in the equation. The total population of these states is $r^2 n_T$, where r is $e^{-3085/T_1}$, so that the fractional population inversion:

$$\frac{n_v}{n_T} = \frac{Z_{vv} q}{f_c r^2} \frac{2.78}{T_2} (2J+1) e^{-\frac{2.78 J(J+1)}{T_2}} \quad (3)$$

Since all molecules leaving the ground state enter the first vibrational level, it is not necessary to consider an additional term for the upper laser level. Combining equations (2) and (3), the total reduction in population inversion $\Delta n_T$ can be obtained:

$$\frac{\Delta n_T}{n_T} = \frac{q}{f_c} \left[ \frac{2 Z_{RR}}{1-r^2} + \frac{2.78 Z_{vv}}{r^2 T_2} (2J+1) e^{-\frac{2.78 J(J+1)}{T_2}} \right] \quad (4)$$

where J is given by FIG. 4. The collision frequency $f_c$ is about $6.5 \times 10^9$ d $(T_2/300)$ where d is the density in atmospheres. Density is used here rather than the more usual pressure because it remains constant during the laser cycle while pressure and temperature are changing. The power in the laser transition is given by $P = hcvqn_T \times 10^{-7}$ watts/cm$^3$. The total number of molecules per centimeter, $n_T$, is given by $2.95 \times 10^{19}$ d molecules/cm$^3$.

Substituting these and the previously given values of $Z_{RR}$ and $Z_{vv}$ into equation (4):

$$P = \frac{1.145 \times 10^9 \, d^2 \, (1-r^2) \sqrt{\frac{T_2}{300}} \frac{\Delta n_T}{n_T}}{1 + \frac{1.63 \times 10^5}{T^2_2} \frac{(1-r^2)}{r^2} (2J+1) e^{-\frac{2.78 J(J+1)}{T_2}}} \quad (5)$$

From FIG. 5, the fractional population inversion $\Delta n_T/n_T$ can be determined by taking the difference between the solid line for $T_1$ and the broken line at the appropriate temperatures. Since r is defined in terms of $T_1$ and J is determined in terms of the temperatures by FIG. 4, equation (5) allows the power density P to be determined as a function of vibrational temperature $T_1$, rotational temperature $T_2$ and density d in atmopsheres.

Figure 6:
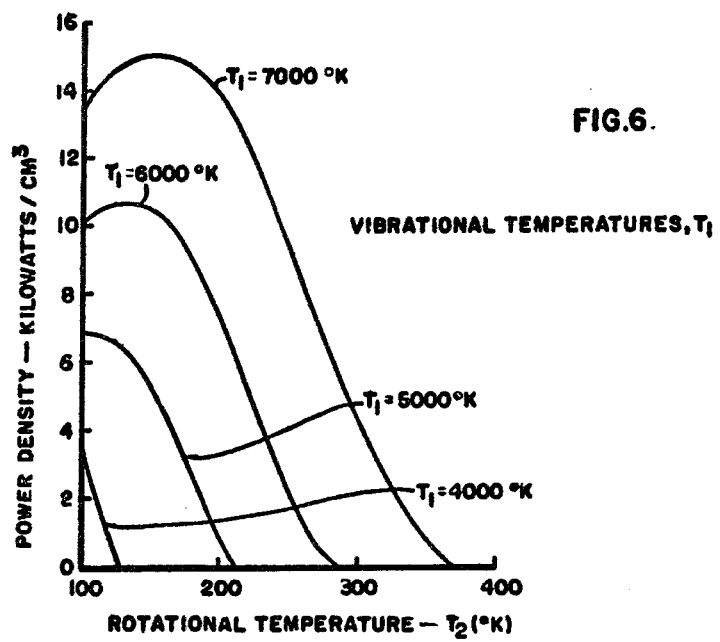
FIG. 6 is a graphical representation of the power density capabilities when practicing the present invention.

FIG. 6 provides a graphical illustration of the power density P as a function of $T_1$ and $T_2$ at one atmosphere of CO. From FIG. 6 it can be seen that cooling will give greater outputs at a given vibrational temperature $T_1$.

The time constant for relaxation between vibrational energy and translational-rotational energy has been determined by extrapolation of high temperature shock tube data and by fluorescence measurements at low signal-to-noise ratio by J. G. Parker in the *Journal of Chemical Physics,* Vol. 41, page 1600 (1964) and R. C. Millikan in the *Journal of Chemical Physics,* Vol. 38, page 2855 (1963). A long extrapolation is required from shock tube measurements, so figures vary widely from 0.2 sec. to 5 sec. Fluorescence measurements have shown total lifetimes as long as 0.14 sec. under trapping conditions, and the variation of lifetime with CO pressure would indicate that most of this is radiative decay. Thus, a representative value of 0.5 sec. will be used to illustrate the theory of operation of the present invention. The value of 0.5 seconds applies to atmopsheric pressure at 300° K. At lower temperatures the vibrational collision number $Z_v$, probably increases, but not very much, so that it will here be assumed constant. Then the loss $L_v$, from this source will be:

$$L_v = 4.186 \, r \, d \sqrt{T_2/360} \text{ cm}^{-1}/\text{molecule/millisecond} \quad (6)$$

Using handbook data for the specific heat of CO, putting in a correction for the small fraction of the energy in vibrational levels, and changing units, a heat capacity of 1.65 cm$^{-1}$/°C./molecule at 300° K., increasing to 1.79 at 100° K. is obtained. Thus, if the starting temperature is designated as $T_S$ and the final temperature $T_F$, the maximum energy $L_M$ which can be lost into rotational and translational energy is given very closely by:

$$L_M = 1.72 \, (T_F - T_S) \text{ cm}^{-1}/\text{molecule} \quad (7)$$

The interaction of electrons with CO molecules is quite complex. There are five basically different types of interaction, each of them quite sensitive in different ways to the electron velocity. Collisions between electrons are sufficiently rare that the electron velocity distribution is determined mainly by the interactions with CO molecules, and since these vary with electron velocity, the resulting velocity distribution is quite different from Maxwellian. Nevertheless, there is enough information available to make a reasonable approximation to the conditions prevailing.

At very low electron energies, the interaction is limited to elastic collisions and collisions in which energy is given up to rotation of the CO. Only a small fraction of the total electronic energy is lost to such collisions, but it is necessary to evaluate it as accurately as possible because the lost energy heats the gas, and the temperature rise is the basic limitation on output energy. At intermediate energies, of the order of 1.5 e.v., most of the interaction is with the vibrational levels of the CO, while at higher energies, interaction with electronic excitation levels and ionization occurs. Since the vibrational interactions are the useful ones, discharge conditions are chosen to maximize the number of electrons in this region. For $N_2$, the conditions have been calculated by A. J. Englehardt et al in the *Physical Review,* Vol. 135, page A1566 (1964), and at a characteristic electron energy of 1.4 volts, more than 99% of the electronic energy goes into vibrational excitation. For CO, such complete calculations are not available, but because of the close similarity between CO and $N_2$, very similar conditions can be expected to occur. Since the vibrational interaction occurs at slightly lower voltage in CO, it is assumed that the optimum will occur with a characteristic electron energy of 1.24 e.v Then for $N_2$, the energy exchange collision frequency is about $6.3 \times 10^{-12} n_T$ or $1.85 \times 10^8$ d, for translation and rotation. For CO, the cross-section is the same as for $N_2$ except at very low energies where the small dipole moment of CO increases the rotational collision probability substantially. See J. L. Pack et al in the *Physics Review,* Vol. 127, page 2084 (1962). Even with this increased collision probability however, the contribution of the low energy electrons to total energy exchange is very small for characteristic energies more than a few tenths of an electron volt. Thus, the value of $N_2$ is probably a very good value for CO as well, but to be conservative a value of $2 \times 10^8$ d is used. Then the total energy lost by each electron to translation and rotation in the CO will be $2 \times 10^9$ d cm$^{-1}$/ms. The total energy $L_R$ lost to translation and rotation for each CO molecule will then be $2 \times 10^9$ ($n_e/n_T$) d, or $L_R = 6.8 \times 10^{-11} n_e$ cm$^{-1}$/ms, where $n_e$ is the number of electrons per cubic centimeter.

For energy transfer to vibration, the cross-section is anamolously high due to the formation of a negative ion which, while unstable, extends the collision time to make it comparable to the vibration period. See G. J. Schulz, *Physics Review*, Vol. 135, Page A988 (1964). For CO molecules in the lowest vibrational state, the cross-section peaks at 1.75 e.v. electron energy, at a value of $8 \times 10^{-16}$ cm$^2$. For molecules in excited vibrational levels, similar cross-section curves can be expected but displaced downward about 0.25 e.v. for each level of excitation. The cross-section curve for CO at a high vibrational temperature can thus be calculated. At 7000° K. this results in a curve peaking at 1.6 e.v., with a cross-section of $4.25 \times 10^{-16}$ cm$^2$ at 1.24 e.v. The mean energy transferred in a vibrational collision is about 4000 cm$^{-1}$ and the electronic velocity at 1.24 electron volts is $4.7 \times 10^7$ cm/sec., so that the total energy transferred from each electron is $8 \times 10^{-8} n_T$ cm$^{-1}$/ms, or $8 \times 10^{-8} n_e$ cm$^{-1}$/ms transferred to CO molecule. Since 1.24 e.v. corresponds to 11,600 ° K., the net energy transferred $E_T$ will be approximately $$8 \times 10^{-8} \left(1 - \frac{T_1}{11,600}\right) n_e \text{ cm}^{-1}/\text{ms}.$$

The transfer of energy to rotation, vibration, and translation varies quite slowly with electronic energy in the region around 1.24 e.v., being roughly proportional to electronic energy. In contrast to this, the energy transferred to electronic states or ionization varies extremely rapidly with electronic energy. As a result, this source of energy transfer is examined independent of an assumed electron energy. In a stable, homogeneous discharge, the rate of production of electrons must equal the rate of losses. In the usual discharge the main sources of electron losses are diffusion, attachment and recombination. For the high pressure bulk operation used by the present invention, diffusion is negligible. Attachment does not exist in CO, so the main source of losses is then recombination. S. C. Brown, in *Basic Data of Plasma Physics*, J. Wiley and Sons, New York, Publishers, (1959) indicates that nitrogen has a recombination coefficient of $1.6 \times 10^{-6}$ cm$^3$/sec at N.T.P. Since most of this is due to disocciative recombination, which is a two body process, the coefficient will vary only slowly with pressure near 1 atmosphere. In view of the similarity of $N_2$ and CO molecules and ions, the coefficient for CO should be very close to the same, and this value will be used to illustrate the theory of operation of the present invention. Then the recombination rate, and hence the electron generation rate, will be $1.6 \times 10^{-6} n_e^2$ sec$^{-1}$. Again assuming a similarity between CO and $N_2$, about 0.0022 of all high speed electrons will produce ionization, the rest losing their energy to other processes. This is readily determined by integrating a simplified model of the cross section data presented by A. J. Englehardt et al in the *Physical Review*, Vol. 135, page A1566 (1964). Then a total of $7.27 \times 10^{-4} n_e^2$ lossy impacts of high speed electrons will occur each sec., with an average of about 10 e.v. loss in each. Then the total loss $L_H$ is $2 \times 10^{-21}$ $(n_e^2/d)$ cm$^{-1}$ per molecule per millisecond. Only a very small fraction of this will appear as heat during the pulse, much of it being radiated, some of it recovered as vibrational energy, and some of it being stored in the form of dissociated atoms.

The energy $E_v$ stored in vibrational levels at the end of the pulse is given approximately in the range of interest by:

$$E_v = 0.68 T_1 - 890 \text{ cm}^{-1}/\text{molecule} \tag{8}$$

Since this is by far the largest loss in the cycle, it should be minimized for best efficiency by using the fewest possible number of molecules for the desired output, as well as the minimum temperature.

The total energy $E_A$ available for laser transitions in a one millisecond pulse is $$E_A = E_T - L_v - E_v. \tag{9}$$

The frequency of the transition varies from 2103 cm$^{-1}$ at 100° K. to 2032 cm$^{-1}$ at 300° K. resulting in losses in the lower state relaxation of 40 to 113 cm$^{-1}$, and averaging about 70 cm$^{-1}$. Then the output energy $E_O$ is given by:

$$\begin{aligned} E_O &= 0.967 \, E_A = 0.967 \, (E_T - L_V - E_V) \\ & \text{cm}^{-1}/\text{molecule} \end{aligned} \tag{10}$$

and the total energy lost to translation and rotation, $E_R$ is given by:

$$E_R = 0.0326 \, (E_T - L_v - E_v) + L_v + L_R. \tag{11}$$

In order to maximize the output, this should equal the maximum energy, $L_m$.

Figure 7:
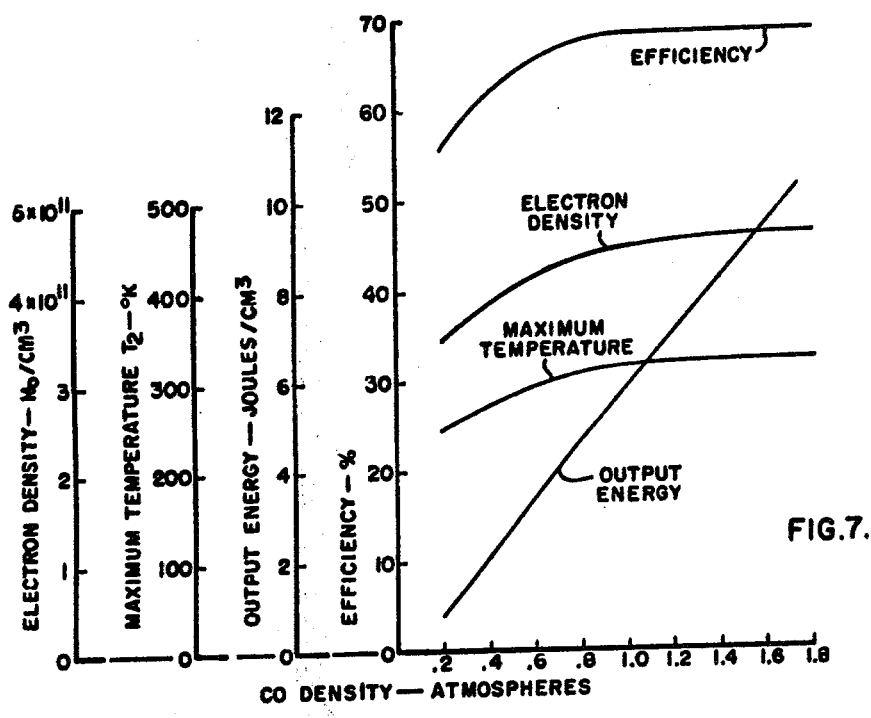
FIG. 7 is a graphical presentation of performances to be expected when practicing the present invention.

FIG. 7 shows the predicted performance at a vibrational temperature $T_1 = 7000°$ K. as a function of CO density, with the rotational temperature $T_2$ and electron density $n_e$ set to produce optimum performance at each density. Predicted performance at a vibrational temperature $T_1 = 6000°$ K. indicates an efficiency of about 1% less, but output energy is about 30% less. No increase in efficiency is indicated by going to higher values of vibrational temperatures $T_1$ because of the losses associated with the rapidly increasing electron density, but the output energy can be increased somewhat by raising the vibrational temperature. It can be seen from FIG. 4 that if maximum output per unit volume is the goal, then the highest possible density should be used. On the other hand, if efficiency is the major concern, then operation between 178 and 1 atmosphere approaches the optimum and should make it much easier to control the discharge conditions.

Referring to FIG. 1, the long lifetime of vibrationally excited carbon monoxide is very sensitive to quenching by almost any polyatomic molecules. Therefore, these must be avoided as impurities in CO. Through the use of liquid nitrogen 12 immersing the active material 2 and contained by the Dewar 10, a starting temperature of approximately 100° K. can be obtained to freeze out of the carbon monoxide most of the detracting polyatomic species, with no time during the pulse to diffuse back in. The polyatomic substances which do have an appreciable vapor pressure at 100° K. are not very hard to avoid, most of them being compounds containing fluorine.

In addition to polyatomic molecules, several monatomic and diatomic gases must also be considered in the explanation of the operation of the present invention. Englehardt et al, supra, shows the quenching action of $H_2$ on the CO vibrational excitation to be 1000 times greater than that of CO, so that 0.1% $H_2$ impurity would double the losses from this source. Since the losses due to CO quenching are negligible, 1% $H_2$ would be required to give a significant, although not serious, effect on the laser performance. An $O_2$ concentration of 2% would have about the same effect, according to measured $O_2$ quenching by Englehardt et al. Since $O_2$ has a long relaxation time itself, the $O_2$ would cease to quench the CO when the $O_2$ is vibrationally excited, thereby allowing still higher concentration. However, $O_2$ has another effect, since electrons can be lost by attachment to $O_2$. This makes it desirable to keep the $O_2$ concentration below approximately 0.25%. Other gases with significant quenching are He, $D_2$, and HD, but they are less effective at quenching then $H_2$, and much less likely to be present as impurities when operating the cycle of the present invention. A commercial C.P. grade of CO contains about 20 PPM of $O_2$ and 5 PPM of $H_2$ and He, so it is not hard to maintain the initial impurity level well below that acceptable for successful operation of the present invention.

Impurities which are generated in the discharge must also be considered. Approximately $10^{17}$ inelastic impacts of high speed electrons occur in a cubic centimeter during a 1 ms pulse. These can produce either electronically excited CO molecules or dissociation of carbon and oxygen atoms. By themselves, C or O atoms should have no effect. Quenching by a monatomic molecule is determined primarily by its mass, and interpolating between values of He and Ne indicates that the percentage of C and O atoms can go as high as 50%, while the total number produced cannot exceed a fraction of 1%. The oxygen atom is capable of electron attachment, but this can occur only by three body collisions or radiative attachment, both of which have much less probability than the dissociative attachment mechanism effective in $O_2$. See Brown, supra. Formation of $O_2$ by combination of O atoms requires a three body collision, so that a negligible amount could recombine during a 1 ms pulse. Of more concern is the combination of O atoms with CO molecules to form $CO_2$, since such collisions occur much more frequently and a much smaller amount of $CO_2$ is harmful. K. G. P. Sulzmann, B. F. Myers and E. R. Bartle in the *Journal of Chemical Physics*, Vol. 42, page 3969 (1965) provides an approximate rate for such a reaction as $K=2.2\times10^{15} e^{-3700/RT}$ cm$^6$mole$^{-2}$sec$^{-1}$, from which the lifetime of an O atom in one atmosphere of CO can be determined to be about 0.13 ms. If the carbon monoxide vibrational energy is available to activate the reaction, the rate would be much higher, but in either case virtually all of the O atoms formed will produce carbon dioxide molecules. Most of the inelastic collisions should form excited carbon monoxide molecules rather than carbon and oxygen atoms, since the electron density is greater in the region where disassociation is not possible. Thus, perhaps $3\times10^{15}$ O atoms/cm$^3$ are formed in the pulse, leading to a carbon dioxide impurity level of approximately 0.01%. Such an impurity level does not exert a catastrophic effect, but is enough to have significance on performance of the present invention. The effect can be minimized however by keeping the electron densities as low as possible, making a somewhat lower vibrational temperature $T_1$ desirable.

The electronically excited carbon monoxide molecules, if left to their own devices, would radiate their energy and revert to the ground state. However, almost all of the molecules excited to triplet levels, and many of those excited to singlet levels, will undergo collisions with carbon monoxide molecules before they radiate. Carbon monoxide is a strong quencher for these excited states, as evidenced by the observance of the carbon monoxide Cameron bands in emission in a discharge only at very low carbon monoxide pressure. The fact that the quenching occurs at such low pressures proves that it is a bimolecular process, and the only two possibilities appear to be a transfer of the energy to vibration, or the formation of a carbon dioxide molecule and a carbon atom. Neither of these processes would be expected to have a high probability except for the presence of an intermediate compound with a considerable bonding energy. An O=C=C=O molecule seems to be the only likely candidate for this compound. Since the bonding energy of this compound is approximately 34,000 cm$^{-1}$ less than that of two isolated ground state carbon monoxide molecules, it can only be formed even temporarily, if the electronic energy of the excited carbon monoxide molecule is made available, and the excess energy is presumably stored as vibration in the six degrees of freedom provided by a four atom molecule. This excess energy varies from about 25,000 cm$^{-1}$ if the excited carbon monoxide molecule is in the lowest excited triplet state, to about 65,000 cm$^{-1}$ if it is in a state just below the dissociation point. Now one of two things must happen. Either a C atom must pull out of the middle and leave, or the molecule must split in half with two carbon monoxide molecules in the electronic ground stage being formed. There is not enough energy in the molecule to allow a C atom to simply break its bonds to both adjacent atoms. Instead, an intermediate stage would have to be involved, most likely:

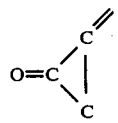

(12)

In order to reach this state, about 25,000 cm$^{-1}$ energy must be available in the specific vibrational configuration necessary to distort the molecule in the proper way. Since only about 11,000 cm$^{-1}$ would be expected in a single degree of freedom for the extreme case of 65,000 cm$^{-1}$ excess energy, this appears quite unlikely. On the other hand, the splitting in half of the molecule would appear to occur naturally as a result of electronic motions. The same resonance which gives carbon dioxide and tricarbon dioxide their stability presumably occurs in dicarbon dioxide. See N. V. Sidgwick, *Chemical Elements and Their Compounds*, Oxford University Press 1950. However, in this case the resonant form would consist of two separate carbon monoxide molecules with no bonding between them. Thus, by pure electronic motion, requiring no motion of the atoms at all, the split in half can be accomplished, so such action is more likely than the splitting off of a carbon atom. An alternative possibility for forming carbon dioxide would be the direct formation of the form shown in equation (12), with subsequent splitting off of a carbon atom. However, the high probability of such a reaction is due to the fact that the triplet state of carbon monoxide is really the free radical O=C=, and free radicals are notorious for their reactivity. The form of the equation

(12) does not involve this free radical property and is quite unlikely to occur. For the same reason, the singlet excited states have a far lesser quenching action. Since the radiative lifetime of the singlet states is very small, this means that almost all singlet excited carbon monoxide molecules would lose their energy by radiation. Hence, there is an implication that in most of the cases where $O=C=C=O$ was formed, the excess energy would be less than 5000 cm$^{-1}$ for each degree of freedom, making the formation of molecules as illustrated by the equation (12) even more unlikely.

Experimental evidence on the interaction of excited mercury atoms with CO is of interest in this connection. The Hg ($6^3 P_1$) atom has an excitation energy comparable to that of the triplet CO state. When it collides with CO, this excited Hg atom forms an unstable Hg CO molecule, and then splits with the Hg in the ground state and the excess energy in CO vibration, rather than transferring most of the energy to the Hg ($6^3 P_O$) state which is energetically possible.

Thus, enough carbon dioxide will be formed on each laser pulse to affect the operation of the laser cycle, but not affect it seriously. The temperature of the liquid nitrogen 12 in the dewar 10 freezes out enough carbon dioxide 2 between the pulses to allow the use of the same charge of carbon monoxide 2 for many shots or pulses. Eventually, the accumulation of $O_2$ and excess carbon dioxide will require a new charge of carbon monoxide. It is to be understood that provisions for supplying the envelope 4 with a new charge of carbon monoxide may be simply provided by adding an inlet and outlet to resupply and purge the existing carbon monoxide charge within the envelope 4. The tube 4 containing the carbon monoxide 2 will gradually accumulate a carbon deposit, Provisions can readily be made for cleaning it. The accumulation of carbon can be a limiting factor on the lifetime of a sealed-off laser as shown in FIG. 1, rather than accumulation of impurities in the gas.

There will also be of the order of 10 ions/cm$^3$ present in the discharge. These are vital to the electrical discharge to reduce space charge, but have little if any effect on the laser action. Most carbon monoxide molecules would not collide with any during a 1 millisecond pulse, and there is no reason to believe that they have a strong quenching action.

For the laser cycle of the present invention at an electron density of approximately $4 \times 10^{11}$/cm$^3$, the space charge would require in the order of one million volts/cm to overcome if there were no compensating positive ions present. Since most of the applied voltage must be available for doing useful work, it follows that the space charge must be neutralized within a small fraction of 1%, so that the conditions can be determined with very small error. One must initially assume that the ion density and electron density are everywhere the same. If the desired uniform distribution of electrons is to be maintained the same distribution of positive ions must also be maintained and once the discharge is set up, the loss of electrons and ions must be equal for the generation of new ones. The stability of the discharge is determined by the mechanisms of generation and loss of electrons and ions.

The three mechanisms by which electrons are lost are diffusion, recombination, and attachment. They are generated by electron collisions with neutral molecules. For a fixed condition of voltage gradient, pressure, and temperature in the active material of carbon monoxide gas 2, diffusion and attachment losses, as well as electron generation, are directly proportional to the electron density, while recombination losses are proportional to the square of the electron density. If losses are governed by diffusion or attachment, a change in electron density does not affect the balance between electrons generated and electrons lost. Thus, the dynamic resistance of the discharge is zero, and the current must be controlled external to the discharge. In the case where attachment governs the losses, the distribution of current density through the cross-section area of the discharge is indeterminate, so that a uniform discharge could not be obtained. Where diffusion losses govern, there is a stable distribution of current density having a maximum at the center of discharge and tapering to zero at the walls of the tube 4. This occurs because only at the walls are the electrons actually lost by diffusion. In other regions the electrons lost to one region are gained in another. Where recombination governs the loss of electrons, an increase in electron density increases the loss rate more than the rate of generation. If the higher density is to be stable, the applied field must be increased until the generation rate matches the loss rate. Thus, the dynamic resistance is positive, making a uniform distribution of current density stable.

In carbon monoxide, attachment does not exist, and hence as long as impurities which exhibit attachment are avoided, the system will have the potentiality of a stable discharge. At the high pressure and relatively high electron density of interest in the system of the present invention, diffusion is comparable to recombination losses only for an extremely thin layer adjacent the walls. A representative value of the extremely thin layer is approximately 0.01 centimeters. Then over the vast majority of the discharge, the stable condition involves very nearly uniform electron density. One of the most important impurities to be avoided in practicing the present invention is oxygen.

Magnetic forces which can constrict a discharge under some conditions have very small effect on the operating cycle of the present invention. For example, assuming a discharge of rectangular shape with small dimension W and large dimension L, with L considerably larger than W, and further assuming that the length of the discharge is large compared to both these dimensions, it can be shown that the magnetic forces will be equivalent to an electric field trying to constrict the discharge with a field strength, $E = 0.0327iW$ volts/cm, for $i$ in amperes/cm$^2$ and W in cm, in the direction of small dimension W. The assumption that the length of the discharge will be large compared to both the length and width dimension is completely false but only leads to over estimating the magnetic forces. Hence a worst condition is assumed in this explanation. In the direction of the length L, a field strength E will be equal to $$.0208iW(1 + \ln \frac{L}{W}).$$

Thus, for current density on the order of 0.35 amps/cm$^2$, the equivalent field strength is in the range of 0.01W. to 0.04W. Even for a gap width of 1 meter, the field strength would only be a few volts per centimeter, compared to approximately 10 KV/cm along the discharge. Thus, the radial currents inward are less than 0.1% of the discharge current, and a very small increase in electron density on the outside of the discharge, and a decrease on the inside, would compensate for a resultant loss and the gain of electrons. Thus it can be seen that magnetic effects are negligible.

Of more importance to the operating cycle of the present invention are thermal effects. If one portion of the gas 2 gets hotter than the rest, it will expand, reducing the density. Such action increases the ionization coefficient so that equilibrium occurs at a higher electron density. A higher electron density represents a higher current so that more heating occurs, making it expand even more. This can lead to a runaway situation where all of the current channels into a narrow portion of the discharge space. For the case of interest here the temperature is determined by heat capacity rather than thermal conductivity. The time required for heating then represents a time delay, so that a finite time is involved in establishing such a condition. The building up of this instability can be computed. Equilibrium results when the ionization rate is equal to the loss rate $\eta$ evn$=\alpha$ n$^2$, where $\eta$ is the ionization coefficient, $\alpha$ is the recombination coefficient, v is the electron drift velocity, and n the electron density. $\eta$ is a function of ET/P. From it can be determined that in the region of interest, $\eta \approx K$ (ET/P)$^4$. The velocity v varies approximately as E$^{0.8}$. Making these substitutions, the following equation is obtained:

$$KE^{5.8} P^{-4} T^4 = \alpha n \qquad (14)$$

If temperature T is made equal to $T_O + \Delta T$, and population n$=n_O + \Delta n$, where $T_O$ and $n_O$ are the equilibrium values, and if it is noted that equation (14) must be satisfied for $T_O$ $n_O$, one finds:

$$1 + \left(\frac{\Delta T}{T_O}\right)^4 = 1 + \frac{\Delta n}{n_O} \qquad (15)$$

If $\Delta T$ is small compared to T, the foregoing equation reduces further to:

$$\frac{4 \Delta T}{T_O} = \frac{\Delta n}{n_O} \qquad (16)$$

It should be noted that $T_O$ is a variable with time, given for the conditions assumed by 100+0.2t, where t is time in microseconds. Equation (14) will remain satisfied in equilibrium because the pressure also varies. For departure from equilibrium the pressure must remain the same throughout the volume so pressure need not be considered as an additional variable. This assumes that expansion with heating occurs in a short time compared to the buildup time for the instability. If this is not true, the buildup will occur more slowly than computed. $\Delta T$ is given by the integral of $\int 0.2(\Delta n/n_O)dt$. Substituting these values into equation (16):

$$.8 \int_o^t \frac{\Delta n}{n_O} dt = (100 + .2t) \frac{\Delta n}{n_O} \qquad (17)$$

Whereby the solution of this equation is given by:

$$\frac{\Delta n}{n_O} = A (1 + .002t)^3 \qquad (18)$$

For a time t=1 ms, $\Delta n/n_O$=27 A, where A is the initial value of $\Delta n/n_O$. The initial value of $\Delta n/n_O$ must not exceed 0.0037, corresponding to $\Delta T$ approximately equal to 0.1° K., if the current density is to remain uniform within about 10%. Differences in starting times for the discharge of the order of 0.5 $\mu$s will produce this difference in temperature. Such values apply only over short distances within the discharge. The velocity with which the gas relaxes to constant pressure upon unequal heating will be on the order of C$\sqrt{\Delta T/T}$, where C is the velocity of sound in the carbon monoxide gas 2, about 27 cm/ms. For a maximum value of 0.1 for $\Delta n/n$, $\Delta T/T$ will average less than 0.01 so that the mean relaxation velocity will be less than 2.7 cm/ms. Then, since the time constant in equilibrium is 0.3 ms, thermal gradients on the order of 1.° K./cm are permissible.

Thus, by taking reasonable care in minimizing thermal gradients and establishing a uniform discharge, a discharge within the envelope 4 can be maintained for a millisecond.

If the initially established discharge is non-uniform, but without thermal gradients, then conditions will be forced toward equilibrium. However, this will take some time, during which unequal temperatures may be established. If the total population $n = n_O + \Delta n$, where $n_O$ is the equilibrium condition which must satisfy equation (13), and $\Delta n$ is the initial departure from equilibrium, then the net ionization rate is given by $-\alpha n_O \Delta n$, giving a time constant for approaching equlibrium of $1/\alpha n_O$, or about 0.16 microsecond. Since $\Delta n$ would have to be several times as large as $n_O$ to produce enough heating in this short time to be significant, this source of non-uniformity need not be worried about.

Figure 9:
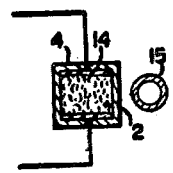
FIG. 9 is a cross-sectional view taken along the line IX—IX as indicated by the arrows in FIG. 1.
Figure 8:
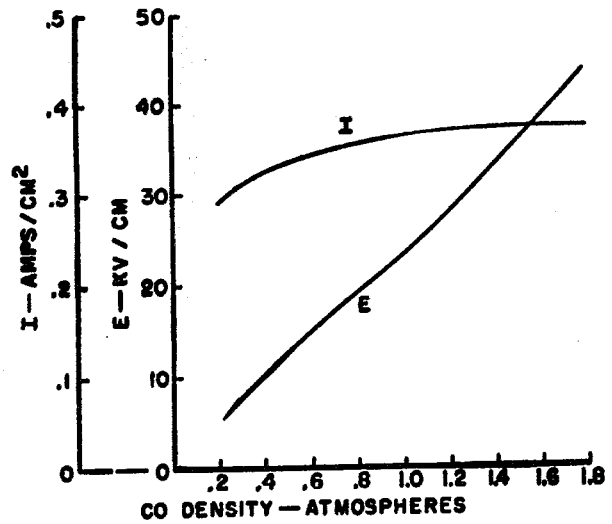
FIG. 8 is a graphical representation of discharge conditions when practicing the present invention.

The voltage and current in the discharge can be calculated from the data of FIG. 7 along with the known drift velocity of electrons in CO from Pack et al, *Physics Review*, (supra). FIG. 8 shows the expected discharge conditions for the operating conditions of FIG. 7. In order to obtain a stable discharge, the starting conditions are extremely important, since it is necessary to distribute ionization initially throughout the CO volume. If a d.c. discharge of FIGS. 1 and 9 is used, two electrodes 14 are placed inside the tube 4 as shown in FIG. 9, one being the anode, connected to a positive voltage source, and the other the cathode, connected to a negative voltage source. Since unexcited CO will absorb the laser frequencies, it is important to maintain the discharge right up to the ends of the tube 2 without field distortion. Hence the electrodes 14 extend right to the Brewster angle windows 6 and 7. Because thermal gradients must be avoided, the cathode must operate cold, and thus thermionic emission cannot be used. In a normal glow discharge, emission from the cathode occurs by ion bombardment, and at low currents the ion density is low enough to make the process inefficient. As a result, minimum cathode voltage drop occurs not at minimum current, but at a current density on the order of 140 d$^2$ amps/cm$^2$ for copper. See Brown, *Basic Data of Plasma Physics*, (supra). From FIG. 8 it can be seen that the desired current density is only a small fraction of this value, so that the cathode will operate in a negative resistance region. Because of the positive resistivity of the plasma, a stable discharge can still result if once started. Before the discharge is initiated, however, the negative resistance of the cathode is so high that a stable discharge will not occur from the mere application of voltage to the terminals. To overcome this difficulty, photoelectric emission can be used to start the discharge. Materials suitable for the cathode, like copper, silver, tungsten, gold or aluminum have work functions in the region of 4 to 5 volts. Thus, ultraviolet radiation with wavelengths shorter than 2500 to 3000 Angstroms is required to obtain photoelectric emission. While photoelectric tubes ar available with response all through the visible and into the infrared, these tubes use delicate compound cathode materials which do not stand up under the bombardment received in operation of the present invention. The discharge conditions shown in FIG. 8 represent about $2 \times 10^8$ electrons/cm$^2$/sec which must be released from the cathode. However, if as many as $10^{17}$ electrons/cm$^2$/sec are released by ultraviolet excitation, the ion bombardment which results will then produce additional emission, and a stable discharge can result. Since it is used only to start the discharge, the ultraviolet source need be energized only for a short time, 10 microseconds or less. A xenon flash lamp 15 such as is often used to provide optical pumping of ruby lasers can provide the desired ultraviolet excitation. Even though the quantum efficiency of simple metal electrodes is very low for photoelectric emission, the energy in the flash lamp need be only a small fraction of the energy in the main discharge. The flash lamp only needs to be energized for less than 1/100 of the time of the main discharge, needs to provide less than 1/10 of the electron flux, and needs to provide less than 1/1000 of the discharge voltage to liberate the electrons. Thus, a quantum efficiency of only 0.01% would result in 1% of the main discharge energy needed for the flash lamp.

The present invention can advantageously utilize a laser tube 4 capable by its own design to hold off the voltage pulse until triggered by the flash of ultraviolet excitation. Thus, in addition to providing uniformity to the discharge, the flash of ultraviolet excitation can be used as the triggering mechanism for the discharge.

Figure 10:
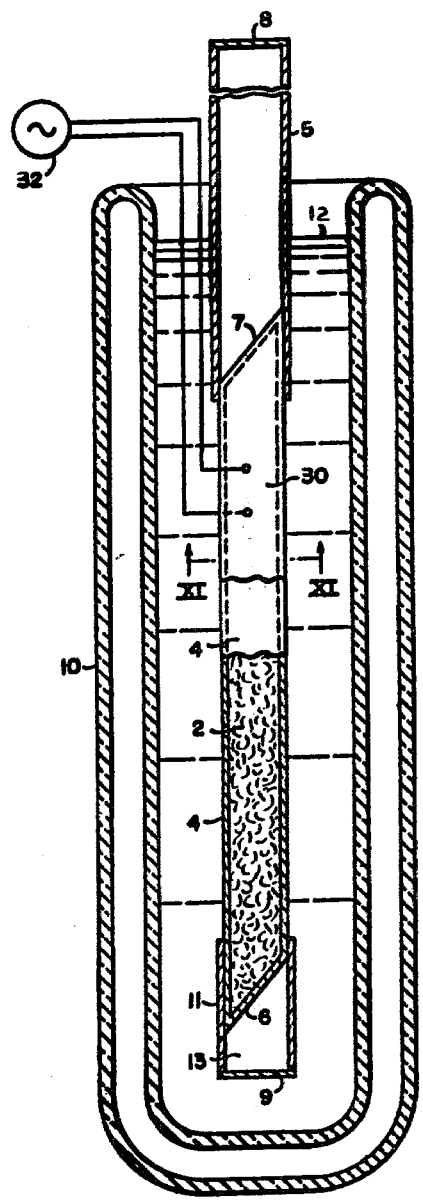
FIG. 10 is another illustrative embodiment of the present invention.
Figure 11:
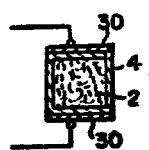
FIG. 11 is a cross-sectional view taken along the line XI—XI as indicated by the arrows in FIG. 10.

While ultraviolet excitation is a preferable mode of operating the laser cycle in accordance with the present invention, other embodiments may also be utilized to obtain a uniform discharge. FIGS. 10 and 11 show an alternate embodiment for obtaining a uniform discharge. Identical reference characters have been assigned to like elements of the embodiment of FIGS. 1 and 9. The embodiment of FIGS. 10 and 11 utilizes two electrodes 30 external to the tube 4. Radio frequency energy from a source 32 is applied to the active carbon monoxide gas 2 through the electrodes 30 causing a uniform electrical discharge to flow in the gas 2 within the tube 4. If the frequency is adjusted so that the capacitive reactance of the walls is equal to or slightly greater than the nominal resistance of the discharge, the reactance will provide a powerful stabilizing influence since it will be large compared to the dynamic resistance of the discharge. Referring to equation (14) the field strength E will no longer be a constant, but will be approximately inversely proportional to the electron density n. Equation (14) then becomes:

$$KP^{-4}T^4 = an^{6.8} \tag{19}$$

When the exponent of the electron density n exceeds that of temperature T, absolute stability results. Instability in the embodiment illustrated in FIG. 10 can only occur on a distance scale small enough that the capacitive reactance is not independent for different portions of the discharge. Keeping temperature differences small across such a small distance can be accomplished with relative ease. Furthermore, across small distances, diffusion will exert an important stabilizing effect. In the absence of a discharge, there is no voltage drop in the capacitive reactance, so that the voltage across the carbon monoxide 2 is far greater than normal. This leads to quick and uniform breakdown initially. Thus, a one millisecond uniform discharge can be readily obtained with RF excitation. The obvious disadvantage of the embodiment of FIG. 10 is one of cost. In large or even moderate size units the RF generator 32 can cost considerably more than the rest of the system.

When using RF excitation the expense of obtaining the required excitation makes it expedient to use a relatively small laser cavity. A minimum cross-section of one cm square is reasonable since diffusion affects the operation within less than 0.1 cm of the walls. A minimum length is on order of 20 centimeters. The resultant gain is approximately 0.6 db and several times this amount of gain can be obtained with a nominal reduction of output. Although less gain would still be useful, any further reduction in the length should be avoided because of a thin unexcited layer of carbon monoxide at each end of the cavity which produces attenuation. In order to keep this layer thin, both ends of the cavity 4 should be non-conducting, and have been provided with a Brewster angle 6.

When utilizing carbon monoxide pressure of 0.4 atmospheres the drive requirement is in the order of 65 kilowatts. Although the RF voltage across the cavity should be about 10 kilovolts in operation, about 20 kilovolts are impressed across the tube 4, with five kilovolts drop in the capacity at each wall, so that in the absence of discharge current, the voltage increases by a factor of approximately two in order to insure initial breakdown.

As with the embodiment of FIG. 1, the RF excitation embodiment of FIG. 10 encloses the tube 4 in a dewar 10 filled with liquid nitrogen 12. A fixed mirror 8 is disposed at the bottom of the tube 4 inside the dewar 10. An adjustable mirror 8 provides output coupling and is located out of the liquid nitrogen 12.

It would be helpful to understand the optical consideration of the present invention. An enclosed volume of gas in which care has been taken to avoid thermal gradients should ordinarily have extremely good optical quality. There are two effects which must be taken into account in the laser cycle of the present invention which might degrade the optical quality. The first is unequal heating during the laser pulse, and the second is the affect of the electrons in the discharge.

It has been shown that a uniformity of current density of about 10% at the end of the pulse is quite reasonable. This corresponds to a variation in density of 2.5%. The refractive index of carbon monoxide is 1.00034 and the laser wavelength is $4.8 \times 10^{-4}$ cm, leading to a total phase shift over that in a vacuum of 16.3 wavelengths/cm. Then a 2.5% variation corresponds to 0.41 wavelength/cm. variation in phase shift. Because of the time constant associated with pressure relaxation, this variation must have a scale factor of 1 cm or less. Then for a length of L cm of CO, the variations should not exceed $0.41 \sqrt{L}$ wavelengths at 1 atmosphere pressure. For 20 meters length, for example, this would amount to a maximum of 18 wavelengths variation. The effect of the free electrons is much smaller than this, the refractive index change due to the electron density desired in this laser cycle being about $10^{-8}$ at the laser wavelength. Thus the major effect is due to non-uniform heating, and if high angular mode purity is desired, great care is to be taken to minimize the non-uniformity of the discharge. The angle mode purity can also be improved by using a larger cross-section area for the laser volume, while decreasing the length and/or pressure in the carbon monoxide.

Efficient operation of the laser of the present invention requires that the frequency jump from one rotational transition to another as the gas temperature $T_2$ rises. The laser optical cavity 4 should be long enough that resonances occur near the center of each of these transition frequencies. Since the line width is in the order of 2000 d megacycles, resonances should be spaced no further than about 500 d megacycles. The optical cavity length should be at least 30/d centimeters to meet this requirement. Of course, the active region need not be this long.

The rate of rise of gain, once threshold is passed is significantly lower than with ruby, so that the oscillation will not buildup rapidly enough to allow spiking to occur with this laser cycle. The amount of energy stored in the laser transition for a given gain value is low, and most important of all, if the nominal power output is exceeded very much, the lower laser level forms a bottleneck as rotational relaxation limits the power output. While spiking is a complex phenomenon, depending on an interaction of spatial and temporal variations which makes it hard to analyze, all of these characteristics lend themselves to better performance without spiking then normally occurs when utilizing ruby as the active material. This is especially important in large units where damage to optical components must be considered.

Maximum feasible energy obtainable when utilizing the present invention depends entirely on factors that can be considered secondary such as damage to optical components, physical limitations as to the size of the optical components, and the availability of the equipment to excite the discharge. Equipment to excite the discharge can be very important, even with the high efficiency of the present invention.

For example, the illustrative embodiments of FIG. 1 can be of the same overall dimensions as those given for the embodiment of FIG. 10. Then about 10 kilovolts output voltage is required from the pulse forming network 16. If the pulse forming network 16 is matched, the capacitors in it must be charged to 20 kilovolts. By using a 2/1 impedance mismatch, this could be reduced to 15 KV. A pulse transformer could also be advantageously used to provide the DC excitation across the electrodes 14.

With either the RF excitation of FIG. 10 or the DC excitation of FIG. 1, the output energy for the dimensions stated is approximately 40 joules. With DC current excitation, it is feasible to make the unit considerably larger. Since the excitation energy is very small for a pulsed modulator, increasing the output current is a very simple matter. At the expense of using a larger dewar 10, the dimensions can advantageously be increased to approximately 50 centimeters in length and 3 centimeters in width for a 300 joule unit.

Extremely large energy outputs can be obtained when utilizing dimensions on the following order. An output density energy of $10^4$ joules/cm$^2$, with a possible peak power of 100 gigawatts, is possible with a tube 4 of approximately 1 meter square and 20 meters long operating at 0.85 atmosphere pressure. Calculated output would be $10^8$ joules. Excitation requirements would be on the order of 2 million volts and at 72,000 amperes. These dimensions are set forth to illustrate the capabilities of a laser operating in accordance with the present invention.

If high efficient is to be maintained, the cycle involves jumping from one rotational transition to another during the pulse as the carbon monoxide gas 2 heats up. Thus, the present invention is best suited to applications where a single frequency operation is not required.

Angular mode purity is appreciably better than with ruby lasers. This does not necessarily mean, however, that single mode operation can be achieved in large physical embodiments of the present invention. Such operations depend on discharge uniformity.

While the present invention has been described with a degree of particularity for the purposes of illustration, it is to be understood that all modifications, alterations and substitutions within the spirit and scope of the present invention are herein meant to be included.

For example, any gas could be used which meets a number of requirements such as
  (1) low probability of vibrational excitation being lost to rotation or translation in collisions.
  (2) high vapor pressure at temperatures suitable for obtaining population inversion.
  (3) high electronic coupling to vibrational levels, and low electronic coupling to translation and rotational levels.
  (4) no low lying electronic excitation.
  (5) allowed vibrational transitions.
  (6) no electronic attachment.

The foregoing list as it stands, however, is very restrictive. The first requirement in practice, requires a diatomic molecule with a reasonably low molecular weight and a fairly low dipole moment. This in turn makes highly ionic molecules undesirable, eliminating the hydrides. In addition to CO, another molecule which can be advantageously used is $N^{14}N^{15}$. In normal $N_2$, vibrational transitions are completely forbidden. In all other respects, it behaves almost identically to CO except with regard to impurities generated in the discharge, and in this respect it is much superior to CO, since it can not produce a carbon deposit or $O_2$ impurities as CO can. In isotopic nitrogen molecules containing one atom of weight 14 and one of weight 15, the vibrational transitions are not completely forbidden, although considerably weaker than in CO. Thus, $N^{14}N^{15}$ could be used in the same cycle, but the gain constant will be appreciably reduced.

I claim as my invention:
1. In a molecular gas laser the method of generating coherent output radiation comprising the steps of:
  (a) generating a particle flux including electrons having an average kinetic energy approximately equal to the upper molecular vibrational energy state of the electronic ground state of said laser gas,
  (b) maintaining said gas at a pressure of the order of atmospheric pressure,
  (c) coupling said particle flux with said gas in an optical resonator to energize said laser gas by resonant collisions of the molecules of said gas with said particle flux to create a population inversion between two radiatively coupled energy states, one of which is below said upper molecular vibrational energy state, and,
  (d) resonating radiation resulting from downward transitions between said radiatively coupled states.
2. A molecular gas laser comprising:
  (a) means forming an enclosed space,
  (b) a molecular gas at substantial atmospheric pressure as an active laser medium within said space,

(c) excitation means coupled to said medium for supplying a particle flux, including electrons having an average kinetic energy approximately equal to a selected upper molecular vibrational-rotational energy state within the electronic ground level of said laser medium to excite said active laser medium by particle impact collision to create a population inversion between said selected upper molecular vibrational-rotational state and a lower molecular vibrational-rotational state within the electronic ground level of said medium radiatively coupled thereto, said upper and lower vibrational-rotational states having energy differences that define particular wavelengths to provide for stimulated emission of radiation at said wavelengths, and (d) resonating means coupled to said medium for resonating said radiation from said medium to obtain stimulated emission of radiation at said wavelengths.

3. A molecular gas laser comprising,
(a) means forming an enclosed space,
(b) a molecular gas which acts as an active laser medium within said space,
(c) means for maintaining said molecular gas at a pressure in the order of atmospheric pressure within said space,
(d) excitation means coupled to said medium for supplying a particle flux, including electrons having an average kinetic energy approximately equal to a selected upper molecular vibrational-rotational energy state within the electronic ground level of said laser medium to excite said active laser medium by particle impact collision to create a population inversion between said selected upper molecular vibrational-rotational state and a lower molecular vibrational-rotational state within the electronic ground level of said medium radiatively coupled thereto, said upper and lower vibrational-rotational states having energy differences that define particular wavelengths to provide for stimulated emission of radiation at said wavelengths, and
(e) resonating means coupled to said medium for resonating said radiation from said medium to obtain stimulated emission of radiation at said wavelengths.

4. A molecular gas laser comprising,
(a) means forming an enclosed space,
(b) a molecular gas which acts as an active laser medium within said space,
(c) means for maintaining said molecular gas at a pressure in the order of atmospheric pressure within said space,
(d) excitation means for generating within said enclosed space electrons having an average kinetic energy approximately equal to an upper molecular vibrational-rotational energy state within the electronic ground level of said laser medium, means responsive to said electrons for creating a population inversion between said upper molecular vibrational-rotational state and a lower molecular vibrational-rotational state within the electronic ground level of said medium radiatively coupled thereto, said upper and lower vibrational-rotational states having energy differences that define particular wavelengths to provide for stimulated emission of radiation at said wavelengths, and
(e) resonating means coupled to said medium for resonating said radiation from said medium to obtain stimulated emission of radiation of said wavelengths.

5. A molecular gas laser as set forth in claim 4, wherein said molecular gas is maintained at a pressure of at least one atmosphere.

6. A molecular gas laser as set forth in claim 4, which includes means for cooling said molecular gas within said enclosed space.

7. A molecular gas laser as set forth in claim 6, wherein said cooling means is external to said enclosed space.

8. A molecular gas laser as set forth in claim 6, wherein said cooling means is effective initially to cool said molecular gas to a temperature of at least 200° K.

9. A molecular gas laser as set forth in claim 4, wherein said molecular gas is carbon monoxide.

10. A molecular gas laser as set forth in claim 9, which includes means for cooling said carbon monoxide within said enclosed space.

11. A molecular gas laser as set forth in claim 10, wherein said cooling means is external to said enclosed space.

12. A molecular gas laser as set forth in claim 10, wherein said cooling means is effective initially to cool said carbon monoxide to a temperature in the order of 100° K.

13. A molecular gas laser as set forth in claim 4, wherein said resonating means is operative along one dimension of said enclosed space, and said excitation means includes means for establishing a uniform discharge transversely of said one dimension.

14. A molecular gas laser as set forth in claim 13, wherein said enclosed space has a substantially greater longitudinal dimension than its transverse dimension and said uniform discharge is transverse to said longitudinal dimension.

15. A molecular gas laser as set forth in claim 13, wherein said molecular gas is carbon monoxide.

16. A molecular gas laser as set forth in claim 4, wherein said resonating means is operative along a resonating axis in said enclosed space, said excitation means includes electrode means positioned on opposite sides of said resonating axis within said enclosed space and extending along said axis and means including said electrode means for establishing a uniform discharge in a direction transverse to said resonating axis.

17. A molecular gas laser as set forth in claim 16, wherein said means for establishing a uniform discharge includes a source of unidirectional potential, and means connecting said source of unidirectional potential to said electrode means.

18. A molecular gas laser as set forth in claim 17, wherein said source of unidirectional potential comprises a pulse generator.

19. A molecular gas laser as set forth in claim 17, which includes means independent of said source of unidirectional potential for producing a quantity of free electrons within said tubular member sufficient to initiate said uniform discharge.

20. A molecular gas laser as set forth in claim 16, wherein said means for establishing a uniform discharge includes a source of RF potential and means for supplying said RF potential to said electrode means.

21. A molecular gas laser as set forth in claim 4, wherein said means defining an enclosed space comprises a tubular member having a longitudinal dimension substantially greater than the transverse dimension thereof, and said excitation means includes a pair of opposed electrode structures positioned within said tubular member and extending along the longitudinal axis thereof, and a source of unidirectional potential connected to said opposed electrode structures.

22. A molecular gas laser as set forth in claim 21, wherein said molecular gas is carbon monoxide.

23. A molecular gas laser as set forth in claim 21, wherein said pair of opposed electrode structures comprise a pair of flat, parallel conductive members positioned on opposite sides of the longitudinal axis of said tubular member.

24. A molecular gas laser as set forth in claim 4, wherein said means defining an enclosed space comprises a tubular member having a longitudinal dimension substantially greater than the transverse dimension thereof, said excitation means includes electrode means positioned on opposite sides of the longitudinal axis of said tube and extending therealong, means for applying a unidirectional. potential to said electrode means, and means independent of said unidirectional potential for producing a quantity of free electrons within said tubular member, the combined effect of said unidirectional potential and said supply of free electrons being sufficient to establish a uniform discharge within said tubular member and transversely of the longitudinal axis thereof.

25. A molecular gas laser as set forth in claim 24, wherein said means for producing a quantity of free electrons includes a source of ultraviolet light.

26. A molecular gas laser as set forth in claim 25, wherein said electrode means includes a cathode member which responds to ultraviolet light from said source by emitting photoelectrons in an amount sufficient to initiate said uniform discharge.

27. A molecular gas laser as set forth in claim 26, wherein said tubular member includes a wall portion transparent to ultraviolet light, and said source of ultraviolet light comprises a flash lamp positioned outside said tubular member and arranged to irradiate said cathode member through said transparent wall portion.

28. A molecular gas laser as set forth in claim 24, wherein said means for producing a quantity of free electrons comprises a source of illumination and means positioned within said tubular member which responds to illumination from said source by emitting photoelectrons.

29. A molecular gas laser as set forth in claim 28, wherein said source of illumination emits ultraviolet light.

30. A molecular gas laser as set forth in claim 4, wherein said means defining an enclosed space comprises a tubular member having a longitudinal dimension substantially greater than the transverse dimension thereof, said excitation means includes electrode means positioned on opposite sides of the longitudinal axis of said tube and extending therealong, means for applying a voltage pulse to said electrode means, a source of illumination, means for energizing said source of illumination during the initial portion of said voltage pulse, and means positioned within said tubular member which responds to illumination from said source by producing photoelectrons, thereby to assist said voltage pulse in establishing a uniform discharge within said tubular member and transversely of the longitudinal axis thereof.

31. A molecular gas laser as set forth in claim 30, wherein said source of illumination is a flash lamp which emits ultraviolet light.

32. A molecular gas laser as set forth in claim 30, wherein said source of illumination is energized for a period of time which is approximately 1/100 of the duration of said voltage pulse.

33. A molecular gas laser comprising,
means forming an enclosed space having a longitudinal dimension substantially greater than the transverse dimension thereof and including opposed wall portions of electrically insulating material extending along said longitudinal dimension, a molecular gas which acts as an active laser medium within said space, conductive electrode means external to said wall portions, radio frequency excitation means connected to said electrodes for causing an electric discharge within said enclosed space and transversely of said longitudinal dimension thereby to generate a particle flux including electrons having an average energy approximately equal to a selected upper vibrational energy state within the electronic ground level of said laser medium, and resonating means coupled to said laser medium for obtaining stimulated emission of radiation resulting energy state.

34. A molecular gas laser as set forth in claim 33 wherein said wall portions form capacitive reactances in series with said electric discharge.

35. A molecular gas laser as set forth in claim 33, wherein the frequency of said radio frequency excitation means is adjusted so that the capacitive reactance of said wall portions is large as compared to the dynamic resistance of said electric discharge, thereby to stabilize said electric discharge.

36. A molecular gas laser as set forth in claim 33 wherein the frequency of said radio frequency excitation means is adjusted so that the capacitive reactance of said wall portions is substantially equal to the nominal resistance of said electric discharge.

37. A molecular gas laser comprising, means defining a lasing chamber having a resonating axis, a molecular gas in said lasing chamber which acts as an active laser medium, means for producing a uniform electric field within said chamber in a direction perpendicular to said resonating axis, means independent of said electric field producing means for producing a supply of electrons within said chamber which is sufficient to initiate a uniform discharge in said chamber, means responsive to said uniform discharge for creating a population inversion between a selected upper molecular vibrational energy state within the electronic ground level of said medium and a lower molecular vibrational energy state within the electronic ground level of said medium and radiatively coupled to said upper state, said upper and lower vibrational energy states having energy differences that define particular wavelengths to provide for stimulated emission of radiation at said wavelengths, and resonating means coupled to said medium for resonating said radiation from said medium to obtain stimulated emission of radiation of said wavelengths.

38. A molecular gas laser as set forth in claim 37, wherein said means for producing a quantity of free electrons includes a source of ultraviolet light.

39. A molecular gas laser as set forth in claim 38, wherein said field producing means includes cathode means which responds to ultraviolet light from said source by emitting photoelectrons in an amount sufficient to initiate said uniform discharge.

40. A molecular gas laser as set forth in claim 37, wherein said means for producing a quantity of free electrons comprises a source of illumination, and means positioned within said lasing chamber and responsive to illumination from said source for producing photoelectrons.

41. A molecular gas laser as set forth in claim 40, wherein said source illumination emits ultraviolet light.

42. A molecular gas laser as set forth in claim 40, wherein said molecular gas is carbon monoxide.

43. A molecular gas laser comprising, means defining a lasing chamber having a longitudinal axis, a molecular gas in said lasing chamber which acts as an active laser medium, electrode means within said chamber and extending along said longitudinal axis, means for applying a voltage pulse to said electrode means, a source of illumination, means for energizing said source of illumination during the initial portion of said voltage pulse, means within said lasing chamber and responsive to illumination from said source for producing a supply of electrons which assist said voltage pulse in establishing a uniform discharge within said chamber in a direction transverse to said longitudinal axis, means responsive to said uniform discharge for creating a population inversion between a selected upper molecular vibrational energy state within the electronic ground level of said medium and a lower molecular vibrational energy state within the electronic ground level of said medium and radiatively coupled to said upper state, and resonating means coupled to said medium for resonating said radiation from said medium to obtain stimulated emission of radiation therefrom.

44. A molecular gas laser as set forth in claim 43, wherein said source of illumination is a flash lamp which emits ultraviolet light.

45. A molecular gas laser as set forth in claim 43, wherein said source of illumination is energized for a period of time which is approximately 1/100 of the duration of said voltage pulse.